United States Patent
Kim et al.

(10) Patent No.: US 7,835,296 B2
(45) Date of Patent: Nov. 16, 2010

(54) ANALYZING SYSTEM OF NETWORK TRAFFIC ACCORDING TO VARIABLE COMMUNICATION'S MASS AND ANALYZING METHOD THEREOF

(75) Inventors: Tae-Yong Kim, Seoul (KR); Hyo-Joo Park, Yeoju-gun (KR)

(73) Assignee: Chung-Ang University Industry-Academic Cooperation Foundation (KR)

( * ) Notice: Subject to any disclaimer, the term of this patent is extended or adjusted under 35 U.S.C. 154(b) by 109 days.

(21) Appl. No.: 11/721,342

(22) PCT Filed: Dec. 14, 2006

(86) PCT No.: PCT/KR2006/005446

§ 371 (c)(1),
(2), (4) Date: Jun. 11, 2007

(87) PCT Pub. No.: WO2007/111409

PCT Pub. Date: Oct. 4, 2007

(65) Prior Publication Data

US 2009/0279443 A1    Nov. 12, 2009

(30) Foreign Application Priority Data

Mar. 28, 2006 (KR) ............ 10-2006-0027846

(51) Int. Cl.
*H04L 12/26* (2006.01)
(52) U.S. Cl. .................. 370/252; 370/229
(58) Field of Classification Search .......... 370/252, 370/241, 229, 230, 231, 232, 233, 234, 235, 370/253
See application file for complete search history.

(56) References Cited

U.S. PATENT DOCUMENTS

| | | | |
|---|---|---|---|
| 6,662,227 B2 | 12/2003 | Boyd et al. | |
| 6,760,567 B1 | 7/2004 | Jeong et al. | |
| 2002/0147772 A1 | 10/2002 | Glommen et al. | |
| 2003/0229692 A1 | 12/2003 | Vo | |
| 2005/0021731 A1 | 1/2005 | Sehm et al. | |
| 2005/0249125 A1 | 11/2005 | Yoon et al. | |
| 2008/0123549 A1* | 5/2008 | Balakrishnan et al. | 370/253 |
| 2008/0195731 A1* | 8/2008 | Harmel et al. | 709/224 |
| 2008/0198759 A1* | 8/2008 | Harmel et al. | 370/252 |
| 2008/0225739 A1* | 9/2008 | Toomey et al. | 370/252 |

OTHER PUBLICATIONS

International Search Report; PCT/KR2006/005446; Apr. 6, 2007.
Written Opinion of the International Searching Authority; PCT/KR2006/005446; Apr. 6, 2007.

* cited by examiner

*Primary Examiner*—Brian D Nguyen
(74) *Attorney, Agent, or Firm*—Cantor Colburn LLP (57) ABSTRACT

An analyzing system for measuring and analyzing communication traffic of a network and an analyzing method using the analyzing system are provided. The system includes a data measurement module configured to capture data that influences a change in communication traffic in a network; a measured data functionizing module configured to obtain a probability density or a cumulative distribution; a distribution function database configured to store function information on theoretically generalized distribution; a parameter decision module configured to apply the data to the function information and to decide parameters; and a suitability check module configured to select information similar to the probability density or the cumulative distribution from among the function information.

9 Claims, 8 Drawing Sheets

(a) IAT DISTRIBUTION ACCORDING TO NUMBER OF PLAYERS IN SERVER (b) IAT DISTRIBUTION ACCORDING TO NUMBER OF PLAYERS IN CLIENT

(a) PACKET SIZE FOR TWO PLAYERS IN SERVER (b) PACKET SIZE FOR THREE PLAYERS IN SERVER (c) PACKET SIZE FOR FOUR PLAYERS IN SERVER (d) PACKET SIZE FOR SIX PLAYERS IN SERVER

ANALYZING SYSTEM OF NETWORK TRAFFIC ACCORDING TO VARIABLE COMMUNICATION'S MASS AND ANALYZING METHOD THEREOF

TECHNICAL FIELD

The present invention relates to an analyzing system for measuring and analyzing communication traffic of a network so that a result of the analysis can be applied to the design of a system including a server providing services on line and to the maintenance and management of the network and to an analyzing method using the analyzing system, and more particularly, to an analyzing system and method for classifying online games by genres and game events and analyzing communication traffic precisely.

BACKGROUND ART

Measuring network game traffic is essential to a game network since results of measuring and analyzing the game traffic can be usefully used for maintenance and management of the game network. It is necessary to generalize the data distribution of traffic elements influencing communication traffic. Through this generalization, a manager can refer to the measuring and analyzing results for the maintenance and management of the game network.

Conventionally, universal tools such as Tcpdump, Expert Sniffer, and Ethereal have been used to measure game traffic. The general purpose of these universal tools is network management, and therefore, the universal tools have many functions unnecessary for measurement and analysis of game traffic and lack functions necessary for the measurement and analysis. For example, Expert Sniffer is a real-time network monitoring tool which supports most of major protocols and suggests causes and solutions of network failure. However, it is not necessary to support all of protocols in order to measure game traffic, but just measurement and full analysis of game traffic is needed. Moreover, although universal tools provide general statistic information on network traffic, game traffic cannot be fully analyzed with only this information and it is necessary to use other statistic packages for full analysis. In other words, measurement of game traffic is separated from analysis of the game traffic, which is inefficient.

Meanwhile, since a play pattern of a player is related with game performance, it is efficient to identify the characteristics of traffic in stages of game events and map design. In conventional game traffic measurement, the number of players is considered, but game events are rarely considered.

DISCLOSURE

Technical Solution

The present invention provides an analyzing system and method for efficiently analyzing communication traffic of a network, and more particularly, communication traffic measured on a network constructed for online games and for increasing reliability of an analysis result.

ADVANTAGEOUS EFFECTS

According to the present invention, communication traffic occurring in a network can be efficiently and accurately analyzed. In addition, traffic occurring while network games are in progress is finely analyzed by game genres and events, thereby increasing the effect of analysis in network maintenance and management.

BEST MODEL

According to an aspect of the present invention, there is provided a system for analyzing network traffic. The system includes a data measurement module configured to measure data that influences a change in communication traffic between a server and a plurality of clients in a network; a log database configured to store the data; a measured data functionizing module configured to obtain a probability density or a cumulative distribution based on the data stored in the log database; a distribution function database configured to store function information on theoretically generalized distribution; a parameter decision module configured to apply the data to the function information stored in the distribution function database and to decide parameters such that the function information is related with the data; and a suitability check module configured to compare the function information, to which the parameters are applied, with the probability density or the cumulative distribution obtained by the measured data functionizing module and to select function information similar to the probability density or the cumulative distribution from among the function information.

The system may further include a valid section setting module configured to set a valid section by excluding data beyond a predetermined reference with respect to a variance or standard deviation of the data stored in the log database. The measured data functionizing module may obtain the probability density or the cumulative distribution using data within the valid section.

The data may be at least one item among a packet size, inter arrival time, a data rate, and a packet rate.

According to another aspect of the present invention, there is provided a method of analyzing network traffic according to the amount of communication. The method includes measuring data that influences a change in communication traffic between a server and a plurality of clients in a network; storing the data in a log database; obtain a probability density or a cumulative distribution based on the data stored in the log database; deciding parameters such that function information on theoretically generalized distribution is related with the data; comparing the function information, to which the parameters are applied, with the probability density or the cumulative distribution based on the data and selecting function information similar to the probability density or the cumulative distribution from among the function information; and generalizing the data using the selected function information.

The method may further include setting a valid section by excluding data beyond a predetermined reference with respect to a variance or standard deviation of the data stored in the log database. The obtaining the probability density or the cumulative distribution may include obtaining the probability density or the cumulative distribution using data within the valid section.

The method may further include classifying the data by game genres when content of communication between the server and the clients is a game service. Here, the obtaining the probability density or the cumulative distribution may include obtaining the probability density or the cumulative distribution based on the classified data.

The game genres may be first-person simulation or shooting (FPS), real-time strategy game (RTS), and massively multiplayer online role playing game (MMORPG).

The method may further include classifying the data by events specially occurring in each game genre before the obtaining the probability density or the cumulative distribution.

The events in the FPS may be no action, shooting, general player, and moving. The events in the RTS may be no action, war, generation of unit, and moving of unit. The events in the MMORPG may be no action, hunting, war, and moving.

The selecting the function information similar to the probability density or the cumulative distribution from among the function information may include comparing a cumulative probability distribution $S_n(x)$ of the data with a cumulative probability distribution $F(x)$ with respect to the function information and rejecting the function information when a maximum deviation between the two cumulative probability distributions is greater than a limit deviation, which is determined according to a sample size and a significance level, where the maximum deviation $D_n$ may be expressed by $$D_n = \text{Max}|F(x) - S_n(x)|,$$

$$S_n(x) = \frac{k}{n}.$$

Suitability of the valid section may be evaluated using a Q-Q plot.

MODE FOR INVENTION

Hereinafter, embodiments of the present invention will be described in detail with reference to the attached drawings.

Figure 1:
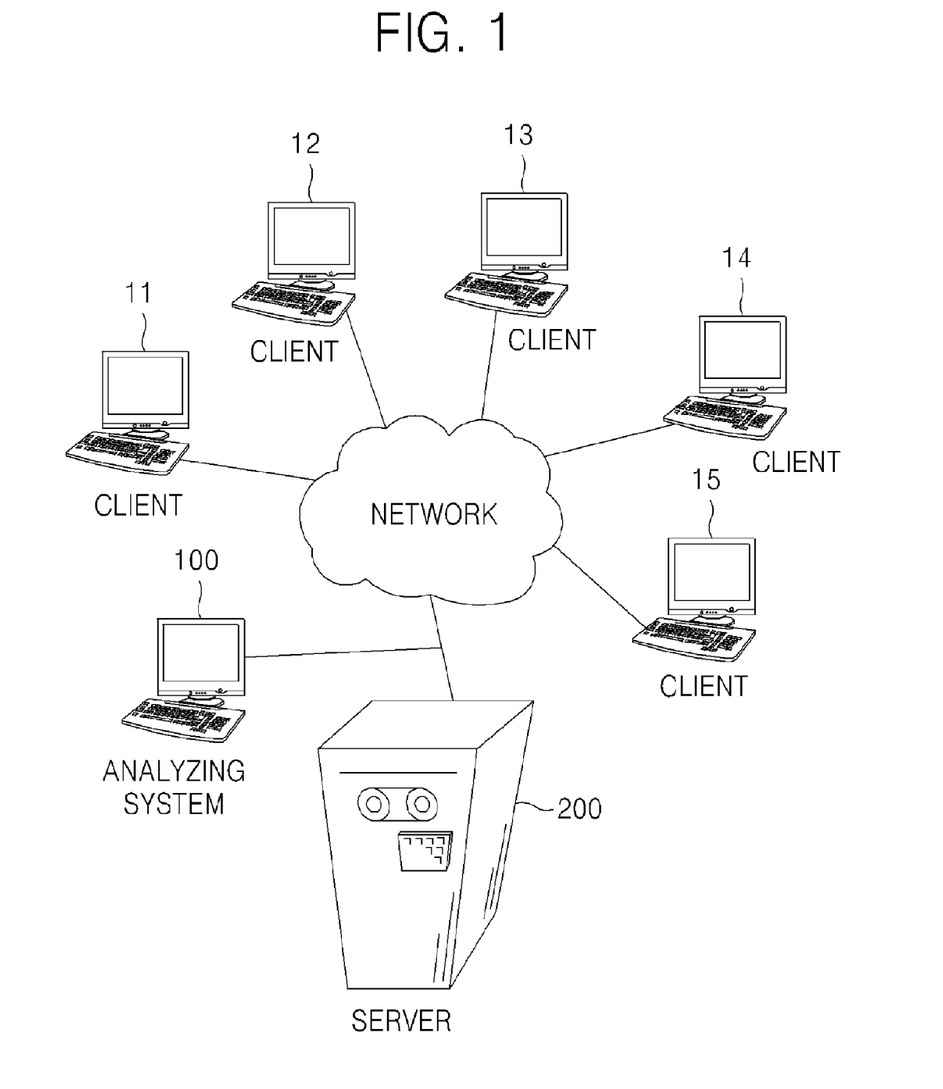
FIG. 1 illustrates an environment of an analyzing system, according to some embodiments of the present invention.
Figure 2:
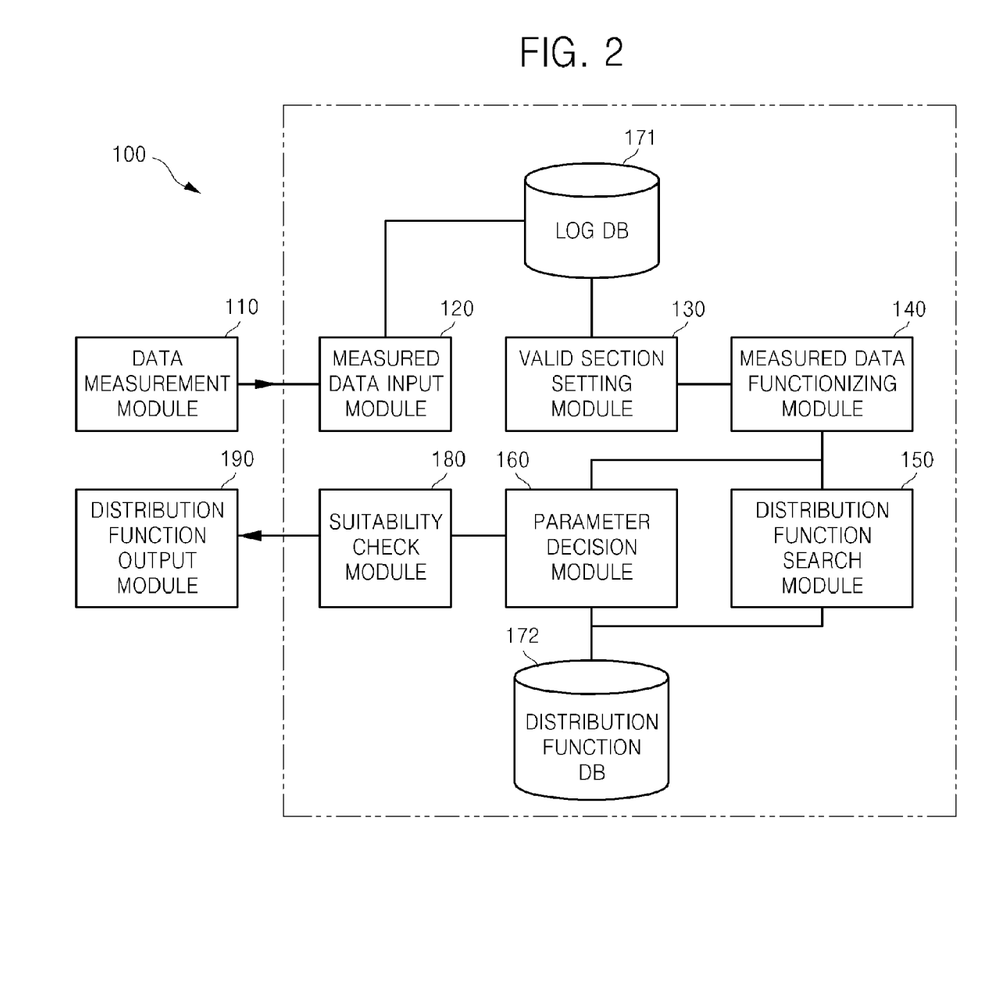
FIG. 2 is a block diagram of an analyzing system, according to some embodiments of the present invention.
Figure 3:
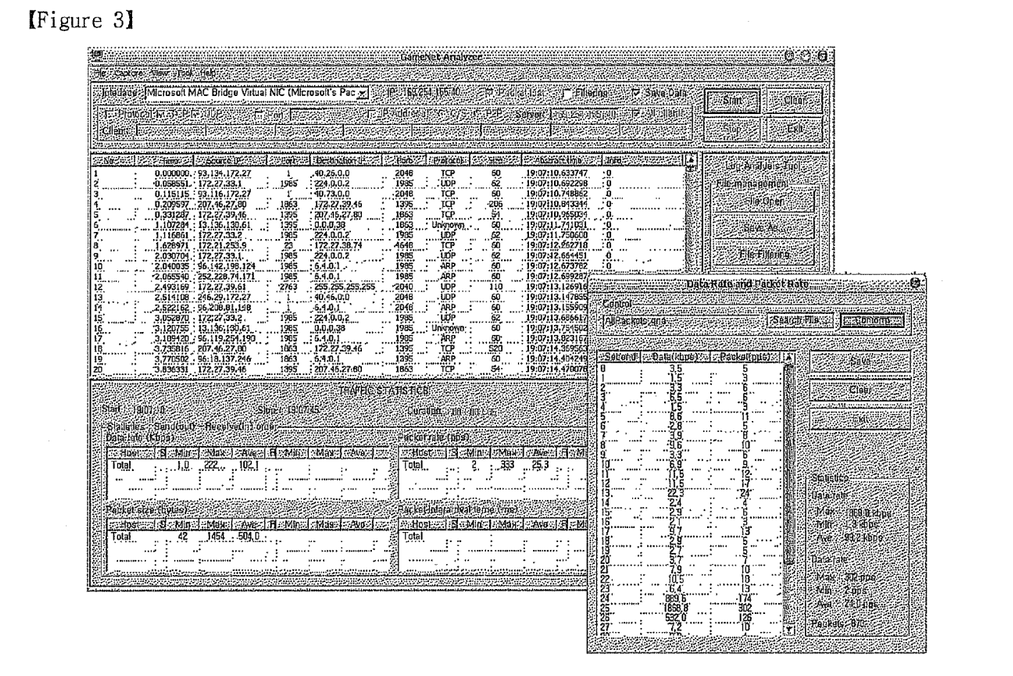
FIG. 3 illustrates a screen shot showing images of an analyzing system, according to some embodiments of the present invention.

FIG. 1 illustrates an environment of an analyzing system 100, according to some embodiments of the present invention. FIG. 2 is a block diagram of the analyzing system 100, according to some embodiments of the present invention. FIG. 3 illustrates a screen shot showing images of the analyzing system 100, according to some embodiments of the present invention.

The analyzing system 100 can check communication traffic of a plurality of clients 11, 12, 13, 14, and 15 which access a server 200 via a network. In order to check the communication traffic, the analyzing system 100 captures packets transmitted between the clients 11 through 15 and the server 200 and Internet Protocol (IP) addresses, port numbers, protocols and other information of the clients 11 through 15, which are destinations of the packets, between the server 200 and the clients 11 through 15 and then classifies and detects them.

Referring to the screen shot illustrated in FIG. 3, the analyzing system 100 can detect and output a size of a packet and the IP addresses, port numbers, protocols and other information of the clients 11 through 15 related with the packet in real time during communication. In addition, the analyzing system 100 can check various traffic elements with respect to communication traffic occurring in the server 200. Here, the traffic elements may be a packet size, inter arrival time (IAT), a data rate and a packet rate with respect to each of the clients 11 through 15.

Figure 4:
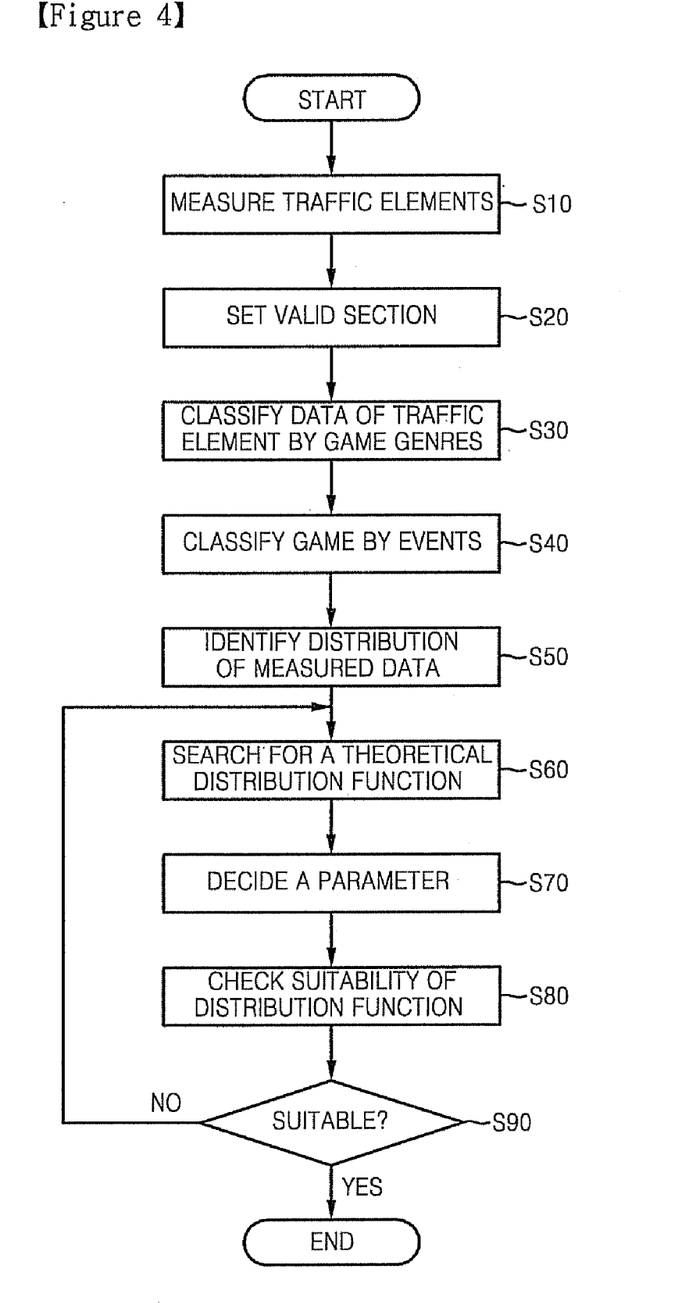
FIG. 4 is a flowchart of an analyzing method, according to some embodiments of the present invention.

A communication traffic analyzing method according to some embodiments of the present invention will be described with reference to FIG. 4, which is a flowchart of the analyzing method, in order to fully explain an analyzing system and method according to the present invention.

S10: Operation of Measuring Traffic Elements

Elements such as a packet size, IAT, a data rate, and a packet rate, which are needed to analyze communication traffic between the server 200 and each of the clients 11 through 15, are measured using a data measurement module 110.

Usually, the data measurement module 110 reads a packet and detects an IP address, a port number, a protocol and other information which are included in the packet. Methods of analyzing the packet and detecting the necessary information have been wide spread. Thus, detailed descriptions thereof will be omitted.

A measured data input module 120 classifies each packet's traffic elements such as a packet size, IAT, a data rate, and a packet rate into one of the clients 11 through 15, which is related with the packet, based on the IP address, the port number, the protocol, and the other information, which are transmitted from the data measurement module 110, and records classified information in a log database (DB) 171. In addition, the traffic elements classified by the measured data input module 120 may be output as illustrated in FIG. 3 so that a manager of the analyzing system 100 can check.

S20: Operation of Setting a Valid Section

The traffic elements recorded in the log DB 171 can be used in analyzing the communication traffic of the network. In some embodiments of the present invention, data distribution of the traffic elements is generalized.

Meanwhile, data of each traffic element may be measured at a value much far from a normal value due to various causes such as sudden changes in a network environment and unexpected transmission of an excessive amount of data. When such abnormal data is used in analyzing traffic, an error between the distribution of measured data of the traffic element and a theoretical distribution function becomes large, which may hinder accurate traffic analysis.

For this reason, a valid section setting module 130 included in the analyzing system 100 sets only a range including above 95% of entire measured data as a valid section to exclude abnormal data from traffic analysis.

The valid section may be determined by normally distributing the data and excluding data beyond a predetermined proportion. However, since the data may not conform to a normal distribution, data beyond a predetermined reference may be excluded based on the variance and the standard deviation of the entire data.

S50: Operation of Identifying Distribution of the Measured Data

A measured data functionizing module 140 included in the analyzing system 100 identifies data distribution based on data only within the valid section. At this time, the data distribution may be generalized into a probability density function (PDF) and a cumulative distribution function (CDF).

The packet size, the IAT, the data rate, and the packet rate included in the traffic elements may change according to factors such as a time zone and the number of players. The data of the traffic elements have various values and the PDF and the CDF may be defined based on various terms such as the time zone and the number of players.

S60: Operation of Searching for a Theoretical Distribution Function

Theoretical distribution functions are stored in a distribution function DB 172 included in the analyzing system 100. A distribution function search module 150 included in the analyzing system 100 may read all distribution function information stored in the distribution function DB 172 sequentially or simultaneously. However, since it is not preferable to simultaneously compare the distribution of data of each traffic element measured by the data measurement module 110 with the theoretical distribution functions, the data distribution of the traffic element may be compared with the theoretical distribution function one by one so as to check suitability and a most preferable theoretical distribution function may be finally found out.

There are various numbers of theoretical distribution functions in statistics. In some embodiments of the present invention, theoretical distribution functions only representing the statistics are stored in the distribution function DB 172, thereby preventing a parameter decision module 160 and a suitability check module 180 from being overloaded. In the embodiments of the present invention, the theoretical distribution functions include a normal function, a lognormal function, a gamma function, a Weibull function, and an exponential function.

S70: Operation of Deciding a Parameter

The parameter decision module 160 decides a parameter of the theoretical distribution function found out by the distribution function search module 150 according to the data of the traffic element. To decide the parameter, a least square method may be used.

In order to finely analyze the traffic, the data of the traffic element may be divided into multiple segments according to the distribution and a parameter may be decided for each segment, instead of deciding only one parameter for the theoretical distribution function corresponding to the entire data of the traffic element. Eventually, as many parameters as the number of segments, into which the data is divided according to the distribution, may exist between the entire data of the traffic element and the theoretical distribution function found out by the distribution function search module 150. As a result, a plurality of theoretical distribution functions may be formed with respect to the entire data of the traffic element.

S80: Operation of Checking Suitability of the Distribution Function

The suitability check module 180 checks the theoretical distribution function and the distribution of the data measured by the data measurement module 110 to determine whether the theoretical distribution function is suitable as a generalized distribution function for the measured data. The suitability of the theoretical distribution function may be checked using a K-S test (in nonparametric statistics) or a Q-Q plot.

The K-S test is a process of comparing a cumulative probability distribution $S_n(x)$ of the measured data with a cumulative probability distribution $F(x)$ with respect to the theoretical distribution function. When a maximum deviation between the two cumulative probability distributions is greater than a limit deviation, which is determined according to a sample size and a significance level, the theoretical distribution function is rejected. The maximum deviation $D_n$ is expressed by Equation (1):

$$D_n = \text{Max}|F(x) - S_n(x)|, \; S_n(x) = \frac{k}{n} \qquad (1)$$

In order to check the suitability of the theoretical distribution function, the data in the valid section is evaluated using the Q-Q plot. At this time, a quantile of values arranged with respect to a variable of the measured data is compared with a quantile of the theoretical distribution function. When the quantiles of the two distributions are the same, a linear pattern appears. After "n" observational values are arranged like $x(i) \leq \ldots \leq x_{(n)}$, an i-th observational value $x_{(i)}$ is set as a y-axis value and an x-axis value is defined as Equation (2):

$$Q_{(i)} = F^{-1}\left(\frac{i - rank_{adj}}{n + n_{adj}}\right) \qquad (2)$$

where $F^{-1}$ is a reversed function of the PDF, and $rank_{adj}$ and $n_{adj}$ are user-defined elements.

S90: Suitable?

The distribution of the measured data is compared with the theoretical distribution function according to a result of the operation performed by the suitability check module 180. When the suitability of the theoretical distribution function is not admitted, the method returns to operation S60 and checking the suitability between a new theoretical distribution function and the distribution of the measured data is repeated.

When a theoretical distribution function, into which the distribution of the measured data can be generalized, is found out through the repetition, it is output by a distribution function output module 190 so that the operation state and the current job of the analyzing system 100 can be checked.

A network traffic analyzing system and method according to some embodiments of the present invention are provided to check traffic occurring in online games and analyze and generalize the traffic. In order to increase reliability of the analysis and to analyze the traffic in accordance with the characteristics of games, the games are classified by genres and by events.

Representative network game genres are first-person simulation or shooting (FPS), realtime strategy game (RTS), and massively multiplayer online role playing game (MMORPG). Components are different according to game genres.

TABLE 1

|  | FPS | RTS | MMORPG |
|---|---|---|---|
| User action | No action | No action | No action |
|  | Shooting | War | Hunting |
|  | General play | Generation of unit | War |
|  | Moving | Moving of unit | Moving |

As illustrated in Table 1, since an FPS game is a shooting game in which a player moves and eliminates enemies with a gun, events are classified into shooting, moving, and general play (including shooting, moving, gaining of items, and use of items) and "no action" is added for comparison of traffic. In an RTS game, a player collects resources, constructs buildings, generates units like military force, and battles with another player, and therefore, events are classified into generation of a unit and collection of resources, war with another player, moving of a unit on a game map, and no action for comparison. A MMORPG is an RPG in which several thousands of players access the same world and play simultaneously. Before playing the MMORPG, a player selects and accesses a particular server and generates a character. In the MMORPG, the player may fulfill his/her mission in order to grow the character, carry out hunting of a non-player character (NPC), moving, item trade, conversation or war with another player, or cooperate with other players by generating a party or a guild. Accordingly, events in the MMORPG are classified into no action, hunting of an NPC, war with other players, and moving of a game world.

This classification of events can lead to fine subdivision of the characteristics of game traffic and can be used in designing events or maps of a game and in evaluating an event in the game.

When the analyzing system and method according to some embodiments of the present invention are used to perform traffic analysis for execution of a network game, the following operations may be further included.

S30: Operation of Classifying the Data of the Traffic Element by Game Genres

Before identifying the distribution of the measured data in operation S50 to analyze traffic occurring during the execution of the game, the data of the traffic element measured by the data measurement module 110 is classified by game genres.

S40: Operation of Classifying the Game by Events

The game classified by genres is classified by events.

Through operations S30 and S40, the data measured by the data measurement module 110 is classified into groups by game genres and game events and traffic analysis is performed with respect to the individual data groups.

Accordingly, when the analyzing system 100 and method according to some embodiments of the present invention are used, network traffic can be finely checked and analyzed according to the genre and the current event of a network game and then generalized, and therefore, traffic corresponding to the game only can be generalized.

Figure 5:
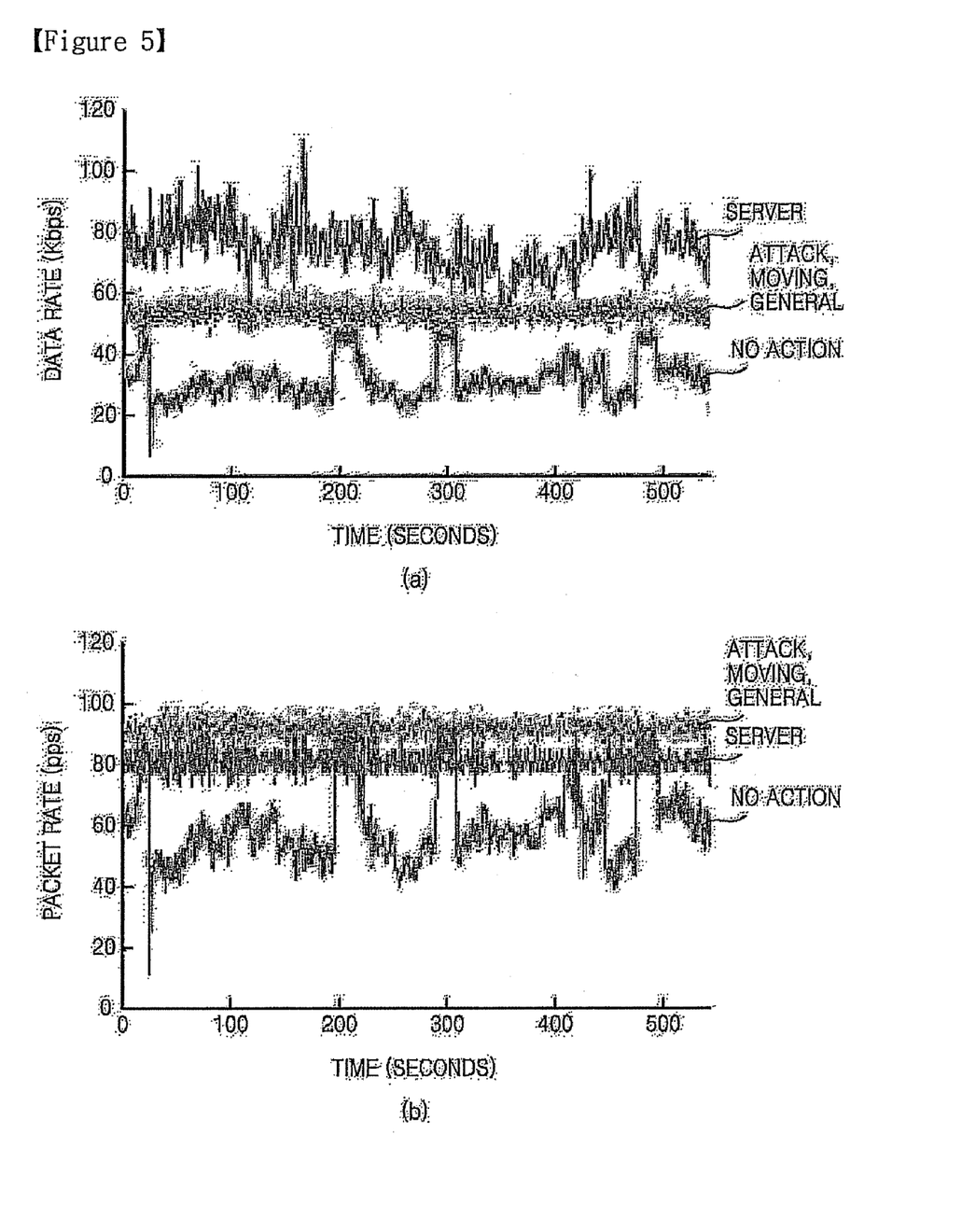
FIG. 5 illustrates the data rates and the packet rates between a server and a client, which are obtained using an analyzing system according to some embodiments of the present invention in game events of a first-person simulation or shooting (FPS) game, Quake 3.
Figure 6:
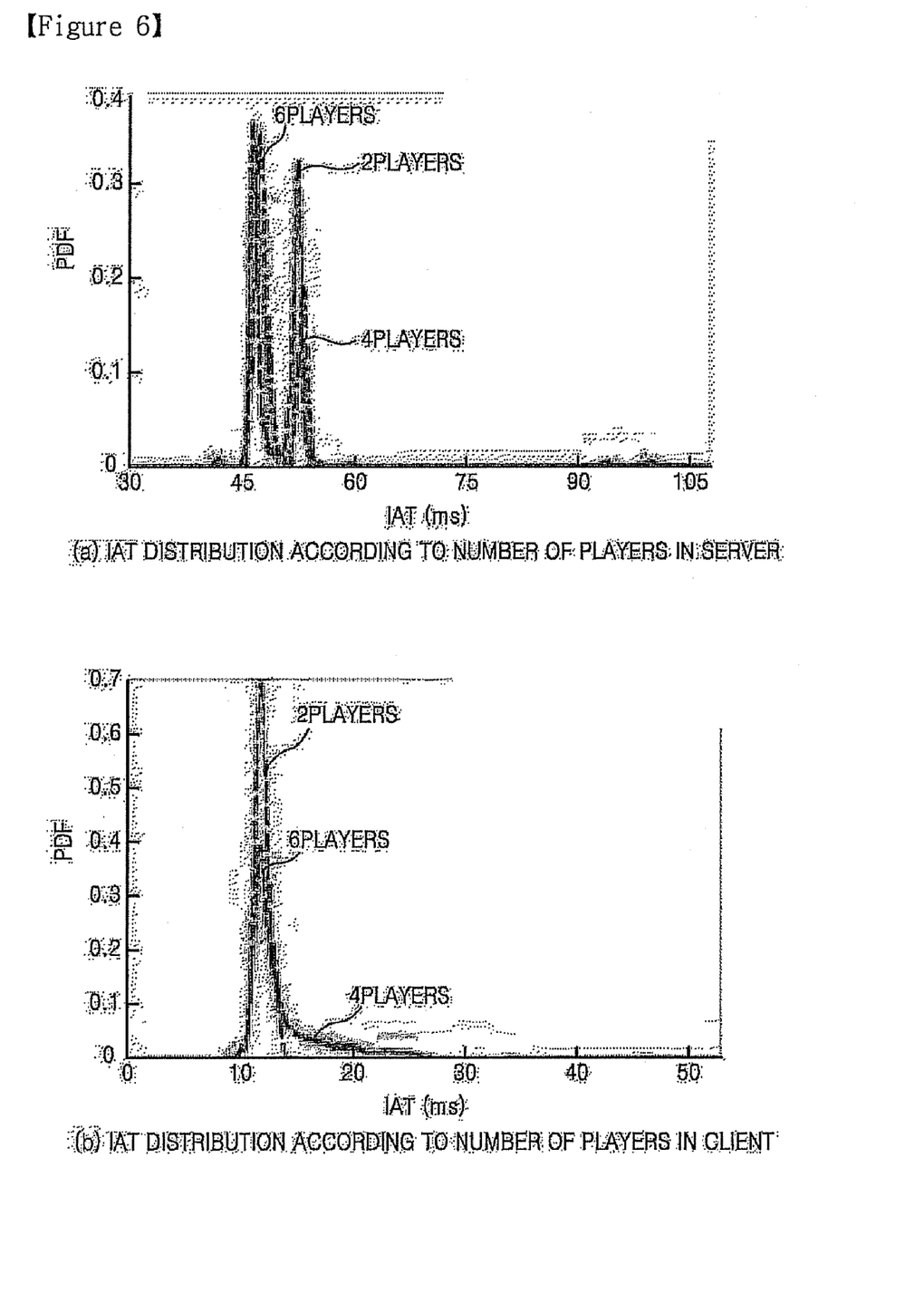
FIG. 6 illustrates the inter arrival time (IAT) distributions, which are respectively obtained in a server and a client according to the number of Quake 3 players using an analyzing system according to some embodiments of the present invention.
Figure 7:
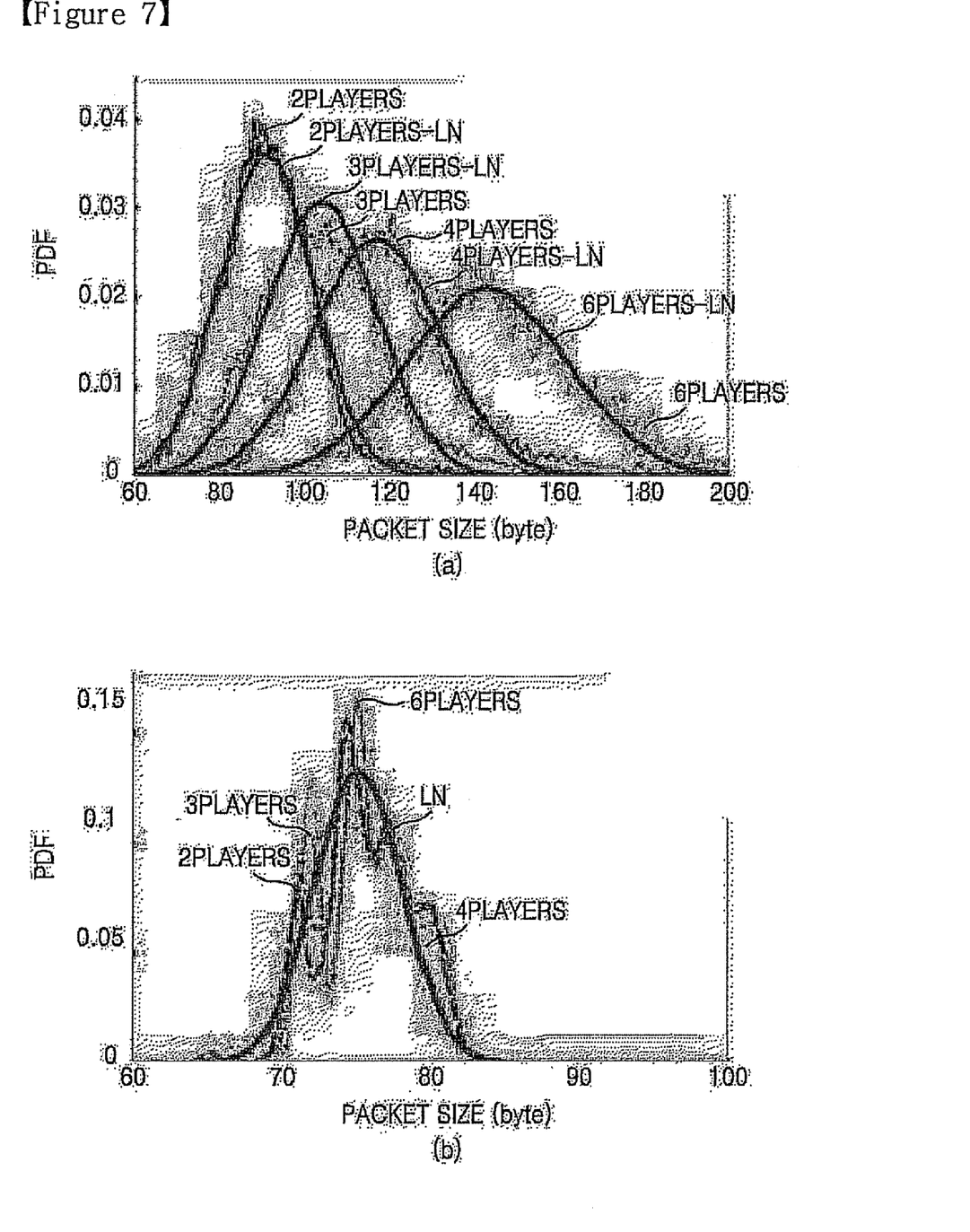
FIG. 7 illustrates the distribution of measured data, which is obtained by measuring packet sizes between a server and clients according to the number of Quake 3 players using an analyzing system according to some embodiments of the present invention, and the distribution selected using an analyzing method according to some embodiment of the present invention.
Figure 8:
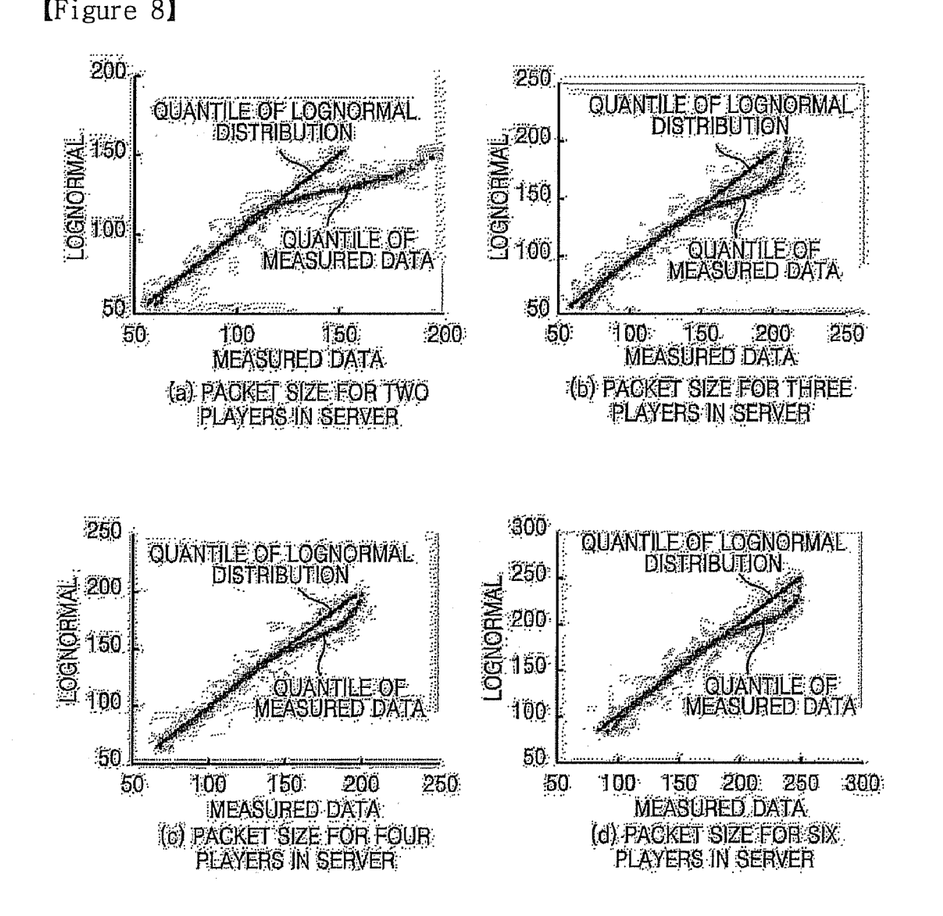
FIG. 8 illustrates Q-Q plots used to decide suitability between the distribution of packet sizes in a server, which is measured in Quake 3 using an analyzing system according to some embodiments of the present invention, and a distribution function determined by the analysis result of the analyzing system.

FIG. 5 illustrates the data rates and the packet rates between a server and clients, which are obtained using an analyzing system according to some embodiments of the present invention in game events of an FPS game, Quake 3. FIG. 6 illustrates the IAT distributions, which are respectively obtained in a server and a client according to the number of Quake 3 players using an analyzing system according to some embodiments of the present invention. FIG. 7 illustrates the distribution of measured data, which is obtained by measuring packet sizes between a server and clients according to the number of Quake 3 players using an analyzing system according to some embodiments of the present invention, and the distribution selected using an analyzing method according to some embodiment of the present invention. FIG. 8 illustrates Q-Q plots used to decide suitability between the distribution of packet sizes in a server, which is measured in Quake 3 using an analyzing system according to some embodiments of the present invention, and a distribution function determined by the analysis result of the analyzing system. Referring to FIGS. 5 through 8, embodiments of an analyzing system and method according to the present invention will be described.

Data of a game traffic element was measured by the analyzing system 100 and personal computers (PCs) in the server 200 and the clients 11, 12, 13, 14, and 15 were all Pentium 4 PCs that had memory of 512 MB-1 GB and ATI Radeon and nVidia GeForce graphic cards and operated on Windows XP.

With respect to three genres of games, Quake 3 (FPS), Starcraft (RTS), and World of Warcraft (WoW, MMORPG), data of traffic elements were measured considering the number of players and the players' actions. Traffic analysis with respect to the Quake 3 will be described with reference to the attached drawings below.

Referring to FIG. 5, which illustrates the data rate and the packet rate in the traffic measured with respect to four game events in the Quake 3, the distribution of transmission rates is different according to the game events. In particular, the transmission rate when there is an event is very different from that when there is no event. When there are events, the transmission rate changes a little according to the type of event. Referring to graphs (a) and (b) in FIG. 5, the transmission rate in the "server" is quite different from that in an event of "no action" but the transmission rates in the events of "attack", "moving", and "general" are similar to one another.

FIG. 6 shows the IAT distribution in the server 200 and the IAT distribution in each of the clients 11 through 15 according to the number of players. Referring to FIG. 6, the IAT distribution is regular in the server 200 and the clients 11 through 15, regardless of the number of players.

FIG. 7 shows the traffic model with respect to the packet size in a server and a client. FIG. 8 shows the Q-Q plots for the graphs illustrated in FIG. 7. Since the packet size agrees with a lognormal distribution function, it is generalized into a lognormal distribution. In addition, as illustrated in FIG. 8, a valid section is evaluated using a Q-Q plot. In FIG. 7, "LN" indicates lognormal.

With respect to Starcraft and WoW, the characteristics of traffic can be analyzed according to the number of players and type of game event. Table 2 shows the results of an analyzing method performed by the analyzing system 100 according to some embodiments of the present invention.

TABLE 2

|  |  | Packet size | IAT(Inter-arrival time) |
|---|---|---|---|
| Quake 3 | Server | Lognormal(m, s) <br> m(n) = 13n + 65, <br> s(n) = 2n + 7 <br> Valid section: <br> [60: 20n + 100] | deterministic: 50 ms |
|  | Client <br> deterministic: 61 byte | Lognormal(75.3) | deterministic: 11 ms <br> deterministic: 78.94 ms |
| WoW | Server | Exponential | Normal |
|  | Client | Normal | Normal |

INDUSTRIAL APPLICABILITY

Traffic occurring while a game is played on a network is finely analyzed according to game genres and types of events, so that the analysis can be effectively used in maintenance and management of the network.

The invention claimed is:

1. A system for analyzing network traffic according to the amount of communication, the system comprising:
   a data measurement module which measures data of a change in communication traffic between a server and a plurality of clients in a network;
   a log database which stores the data;
   a measured data functionizing module which obtains a probability density distribution or a cumulative distribution based on the data stored in the log database;
   a distribution function database which stores function information on a theoretically generalized distribution;
   a parameter decision module which applies the data to the function information stored in the distribution function database and selects parameters such that the function information is related with the data;
   a suitability check module which compares the function information, to which the parameters are applied, with the probability density distribution or the cumulative distribution obtained by the measured data functionizing module and selects function information similar to the probability density distribution or the cumulative distribution from among the function information; and
   a valid section setting module which sets a valid section by excluding data beyond a predetermined reference with respect to a variance or a standard deviation of the data stored in the log database,
   wherein the measured data functionizing module obtains the probability density distribution or the cumulative distribution using data within the valid section.

2. The system of claim 1, wherein the data is at least one item selected from the group consisting of a packet size, inter arrival time, a data rate, and a packet rate.

3. A method of analyzing network traffic according to the amount of communication, the method comprising:
   measuring data of a change in communication traffic between a server and a plurality of clients in a network via a computer;
   storing the data in a log database;
   obtaining a probability density distribution or a cumulative distribution based on the data stored in the log database;
   deciding parameters such that function information of a theoretically generalized distribution is related with the data;
   comparing the function information, to which the parameters are applied, with the probability density distribution or the cumulative distribution and selecting function information similar to the probability density distribution or the cumulative distribution from among the function information;
   generalizing the data using the selected function information; and
   setting a valid section by excluding data beyond a predetermined reference with respect to a variance or standard deviation of the data stored in the log database,
   wherein the obtaining the probability density distribution or the cumulative distribution comprises obtaining the probability density distribution or the cumulative distribution using data within the valid section.

4. The method of claim 3, further comprising classifying the data by game genres when content of communication between the server and the clients is a game service,
   wherein the obtaining the probability density distribution or the cumulative distribution comprises obtaining the probability density distribution or the cumulative distribution based on the classified data.

5. The method of claim 4, wherein the game genres are first-person simulation or shooting (FPS), realtime strategy game (RTS), and massively multiplayer online role playing game (MMORPG).

6. The method of claim 4, further comprising classifying the data by events which occur in each game genre before the obtaining the probability density distribution or the cumulative distribution.

7. The method of claim 6, wherein the events in the FPS are no action, shooting, general player, and moving;
   wherein the events in the RTS are no action, war, generation of unit, and moving of unit; and
   wherein the events in the MMORPG are no action, hunting, war, and moving.

8. The method of claim 4, wherein the selecting the function information similar to the probability density distribution or the cumulative distribution from among the function information comprises comparing a cumulative probability distribution $S_n(x)$ of the data with a cumulative probability distribution $F(x)$ with respect to the function information and rejecting the function information when a maximum deviation between the two cumulative probability distributions is greater than a limit deviation, which is determined according to a sample size and a significance level, where the maximum deviation $D_n$ is expressed by $$D_n = \text{Max}|F(x) - S_n(x)|, \; S_n(x) = \frac{k}{n}.$$

wherein n is the number of independent samples which are collected and arranged in numerical order in array X as $x[0] \ldots x[n-1]$, k is an index of the ordered array, and Max is computed over all k from 0 to n−1.

9. The method of claim 4, wherein suitability of the valid section is evaluated using a Q-Q plot.

\* \* \* \* \*